(12) United States Patent
Wieland (10) Patent No.: US 12,320,552 B1
(45) Date of Patent: Jun. 3, 2025

(54) SOLAR-HEATED DECKING BOARDS

(71) Applicant: Michael Wieland, Greer, SC (US)

(72) Inventor: Michael Wieland, Greer, SC (US)

(*) Notice: Subject to any disclaimer, the term of this patent is extended or adjusted under 35 U.S.C. 154(b) by 246 days.

(21) Appl. No.: 18/109,335

(22) Filed: Feb. 14, 2023

(51) Int. Cl.
*F24S 10/00* (2018.01)
*E04F 15/02* (2006.01)
*F24S 10/70* (2018.01)

(52) U.S. Cl.
CPC ........ *F24S 10/70* (2018.05); *E04F 15/02038* (2013.01); *E04F 15/02183* (2013.01); *E04F 2201/0107* (2013.01); *E04F 2201/023* (2013.01); *E04F 2201/043* (2013.01)

(58) Field of Classification Search
CPC .. F24S 10/00; F24S 10/70; F24S 10/50; E04F 15/02038; E04F 15/02183; E04F 2201/00; E04F 2201/0107; E04F 2201/023; E04F 2201/043
See application file for complete search history.

(56) References Cited

U.S. PATENT DOCUMENTS

| | | | |
|---|---|---|---|
| 4,085,728 | A | 4/1978 | Tomchak |
| 4,462,125 | A | 7/1984 | Jakowicki |
| 5,233,971 | A | 8/1993 | Hanley |
| D418,926 | S | 1/2000 | Owens |
| 8,065,849 | B2 | 11/2011 | Douglass |
| 9,683,756 | B2 | 6/2017 | Barmore |
| 10,969,144 | B2 * | 4/2021 | Brisebois ............... H02S 40/44 |
| 12,163,599 | B2 * | 12/2024 | Refaeli ................... E04C 2/525 |
| 2003/0163965 | A1 * | 9/2003 | Hydock ................. F24D 3/142 52/406.2 |
| 2008/0201874 | A1 | 8/2008 | Coyle |
| 2010/0180885 | A1 * | 7/2010 | Lee ........................ F24S 20/63 126/709 |
| 2010/0224234 | A1 * | 9/2010 | Fischer ................ F28F 21/065 29/428 |
| 2015/0280040 | A1 * | 10/2015 | Siddiqui ............... H02S 40/425 136/246 |
| 2017/0130969 | A1 * | 5/2017 | Lester ..................... F24S 40/20 |

FOREIGN PATENT DOCUMENTS

WO 2007060392 5/2007

* cited by examiner

*Primary Examiner* — Chi Q Nguyen
(74) *Attorney, Agent, or Firm* — Kyle A. Fletcher, Esq.

(57) ABSTRACT

The solar-heated decking boards includes a plurality of deck planks and a fluid transport structure. The plurality of deck planks forms a component of the fluid transport structure. The plurality of deck panels forms the horizontally oriented surface formed by a deck. Each individual deck plank selected from the plurality of deck planks forms a load bearing structure. Each selected individual deck plank further attaches to one or more additional individual deck planks selected from the plurality of deck planks to form the horizontally oriented surface. The plurality of deck planks are fluidically interconnected. The plurality of deck planks forms a fluidic connection within the fluid transport structure. The plurality of deck planks collects solar energy and converts the collected solar energy into heat. The plurality of deck planks forms a heat exchange structure that heats water that flows through the fluid transport structure.

13 Claims, 3 Drawing Sheets

SOLAR-HEATED DECKING BOARDS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of solar heat collectors using working fluids the working fluids being conveyed between plates having conduits formed by paired plates and internal partition means. (F24S10/502)

SUMMARY OF INVENTION

The solar-heated decking boards comprises a plurality of deck planks and a fluid transport structure. The plurality of deck planks forms a component of the fluid transport structure. The plurality of deck panels forms the horizontally oriented surface formed by a deck. Each individual deck plank selected from the plurality of deck planks forms a load bearing structure. Each selected individual deck plank further attaches to one or more additional individual deck planks selected from the plurality of deck planks to form the horizontally oriented surface. The plurality of deck planks are fluidically interconnected. The plurality of deck planks forms a fluidic connection within the fluid transport structure. The plurality of deck planks collects solar energy and converts the collected solar energy into heat. The plurality of deck planks forms a heat exchange structure that heats water that flows through the fluid transport structure.

These together with additional objects, features and advantages of the solar-heated decking boards will be readily apparent to those of ordinary skill in the art upon reading the following detailed description of the presently preferred, but nonetheless illustrative, embodiments when taken in conjunction with the accompanying drawings.

In this respect, before explaining the current embodiments of the solar-heated decking boards in detail, it is to be understood that the solar-heated decking boards is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar-heated decking boards. It is therefore important that the claims be regarded as including such equivalent construction insofar as they do not depart from the spirit and scope of the solar-heated decking boards. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
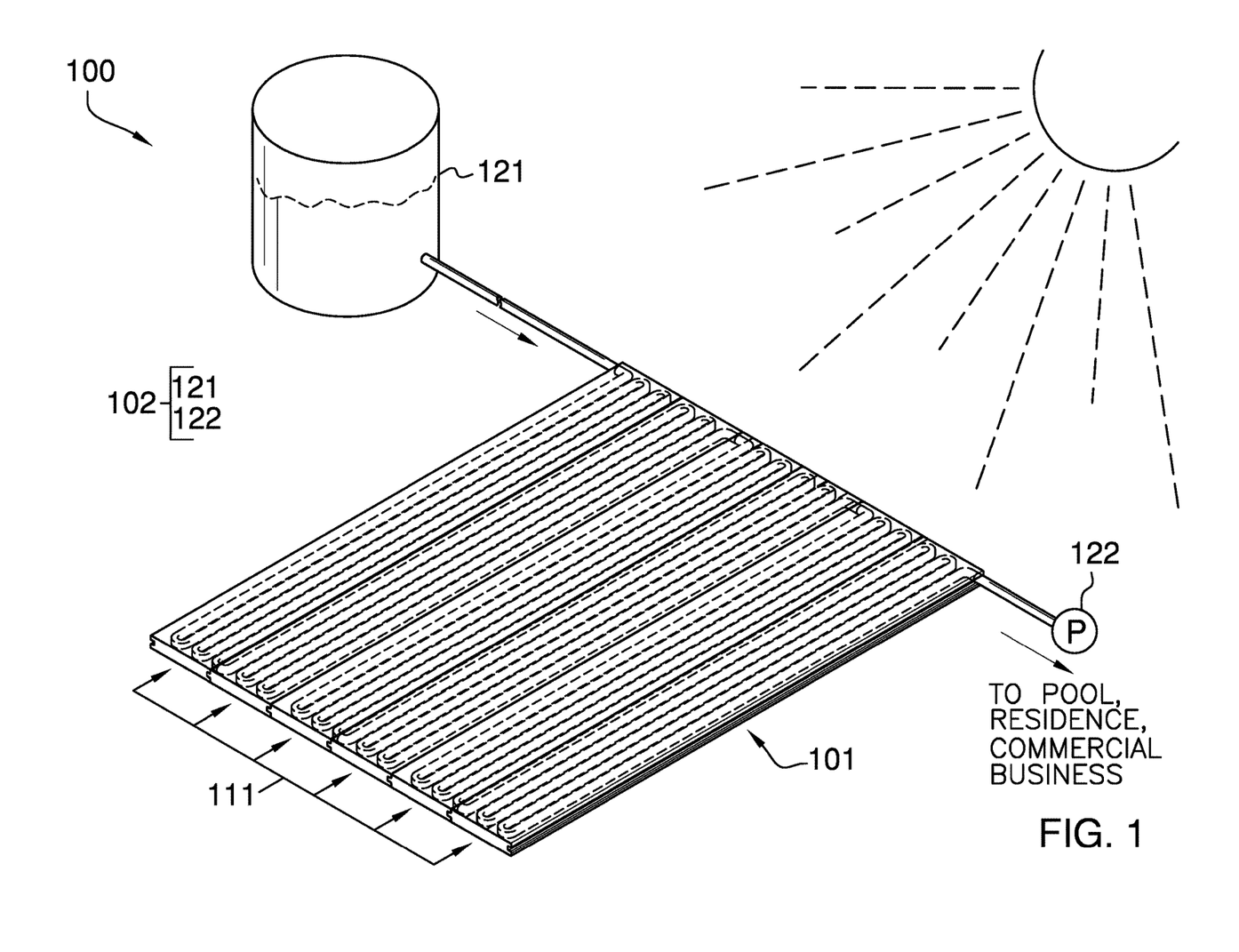
FIG. 1 is a perspective view of an embodiment of the disclosure.
Figure 2:
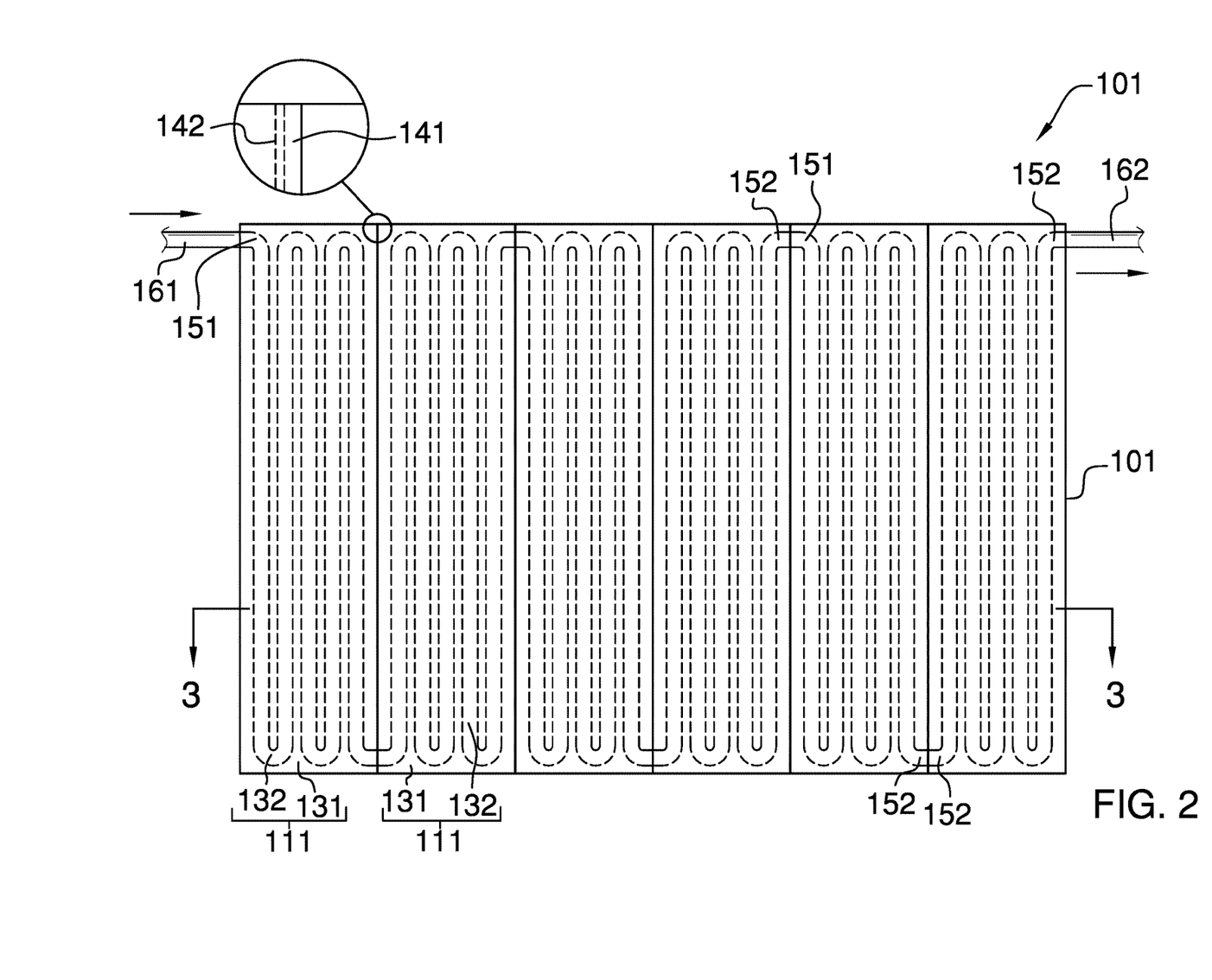
FIG. 2 is a front view of an embodiment of the disclosure.
Figure 3:
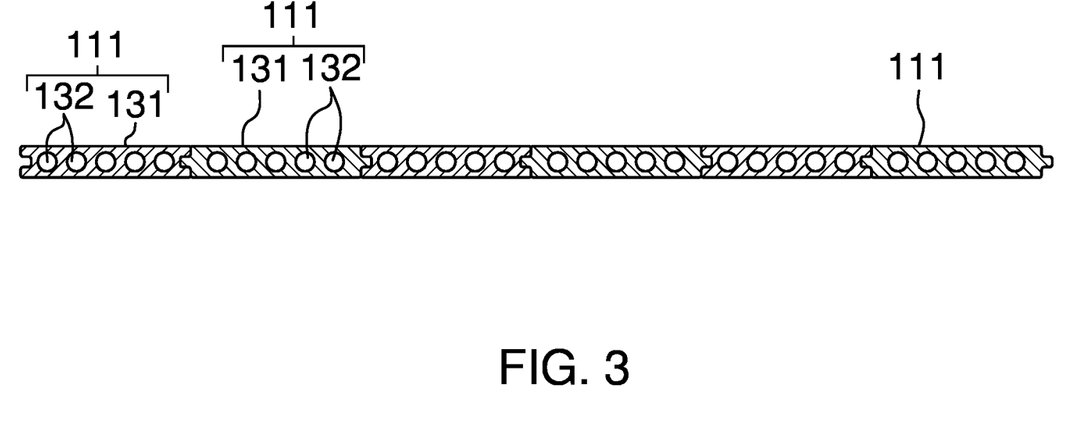
FIG. 3 is a cross-sectional view of an embodiment of the disclosure across 3-3 as shown in FIG. 2.

Detailed reference will now be made to one or more potential embodiments of the disclosure, which are illustrated in FIGS. 1 through 3.

The solar-heated decking boards 100 (hereinafter invention) comprises a plurality of deck planks 101 and a fluid transport structure 102. The plurality of deck planks 101 forms a component of the fluid transport structure 102. The plurality of deck panels forms the horizontally oriented surface formed by a deck. Each individual deck plank selected from the plurality of deck planks 101 forms a load bearing structure. Each selected individual deck plank further attaches to one or more additional individual deck planks selected from the plurality of deck planks 101 to form horizontally oriented surface. The plurality of deck planks 101 are fluidically interconnected. The plurality of deck planks 101 forms a fluidic connection within the fluid transport structure 102. The plurality of deck planks 101 collects solar energy and converts the collected solar energy into heat. The plurality of deck planks 101 forms a heat exchange structure that heats water that flows through the fluid transport structure 102.

The fluid transport structure 102 is a fluid management system. The fluid transport structure 102 stores water. The fluid transport structure 102 transports water into the plurality of deck planks 101 for heating. The fluid transport structure 102 comprises a reservoir structure 121 and a pump structure 122. The reservoir structure 121 forms a fluidic connection with the plurality of deck planks 101. The pump structure 122 forms a fluidic connection with the plurality of deck planks 101.

The reservoir structure 121 is a fluid containment structure. The reservoir structure 121 stores the water that flows through the fluid transport structure 102 in anticipation of use. The reservoir structure 121 forms a fluidic connection with the intake fitting 151 of the individual deck plank 111 selected from the plurality of deck planks 101 that is designated to receive the water into the plurality of deck planks 101 for heating. The reservoir structure 121 further comprises a feed fitting 161. The feed fitting 161 forms a fluidic connection with the intake fitting 151 of a first individual deck plank 111 selected from the plurality of deck planks 101.

The feed fitting 161 is a fitting. The feed fitting 161 forms the fluidic connection between the reservoir structure 121 and an individual deck plank 111 selected from the plurality of deck planks 101. The feed fitting 161 discharges the water flowing from the reservoir structure 121 into the hairpin exchanger 132 formed by the plurality of deck planks 101 through the intake fitting 151 of an individual deck plank 111 selected from the plurality of deck planks 101.

The pump structure 122 is a pump. The pump structure 122 generates a pressure differential from the reservoir structure 121 and through the hairpin exchanger 132 of the plurality of deck planks 101 into the pump structure 122. The pressure differential generated by the pump structure 122 provides the motive forces necessary to: a) draw the water out of the reservoir structure 121; b) move the drawn water through the hairpin exchanger 132 formed by the plurality of deck planks 101; and, c) draw the water the flow out of the hairpin exchanger 132 into the pump structure 122. The pump structure 122 further provides the water received from the hairpin exchanger 132 with the motive forces necessary to transport the received water to its final destination. The pump structure 122 forms a fluidic connection with the discharge fitting 152 of the individual deck plank 111 selected from the plurality of deck planks 101 that is designated to discharge the heated water into the pump structure 122.

The pump structure 122 further comprises a transfer fitting 162. The transfer fitting 162 forms a fluidic connection with the discharge fitting 152 of a second individual deck plank 111 selected from the plurality of deck planks 101. The transfer fitting 162 is a fitting. The transfer fitting 162 forms the fluidic connection between the pump structure 122 the discharge fitting 152 of an individual deck plank 111 selected from the plurality of deck planks 101. The transfer fitting 162 receives the water flowing from the hairpin exchanger 132 formed by the plurality of deck planks 101 into the pump structure 122 The transfer fitting 162 transports the received water into the pump structure 122.

The plurality of deck planks 101 comprises a collection of individual deck planks 111. The plurality of deck planks 101 are mechanically interconnected such that any first individual deck plank 111 selected from the plurality of deck planks 101 attaches to one or more additional individual deck planks 111 selected from the plurality of deck planks 101. The plurality of deck planks 101 are connected to form a horizontally oriented supporting surface. Any first individual deck plank 111 selected from the plurality of deck planks 101 is identical to any second individual deck plank 111 selected from the plurality of deck planks 101.

The plurality of deck planks 101 are fluidically interconnected. By fluidically interconnected is meant that any first individual deck plank 111 selected from the plurality of deck planks 101 forms a fluidic connection with one or more additional individual deck planks 111 selected from the plurality of deck planks 101. The plurality of deck planks 101 forms a portion of the fluid transport path formed by the fluid transport structure 102. The plurality of deck planks 101 fluidically connects to the fluid transport structure 102. The plurality of deck planks 101 is a heat transfer structure. The plurality of deck planks 101 forms a heat sink that: a) collects solar energy; and, b) converts the collected solar energy into heat energy; and, c) transfers the converted energy to water that flows through the fluid transport structure 102.

Each individual deck plank 111 is a disk shaped structure. Each individual deck plank 111 is a rigid structure. Each individual deck plank 111 is a load bearing structure. Each individual deck plank 111 forms a portion of the load bearing capacity of the horizontally oriented load bearing surface formed by the plurality of deck planks 101. Each individual deck plank 111 comprises a disk structure 131 and a hairpin exchanger 132. The hairpin exchanger 132 mounts in the disk structure 131.

The disk structure 131 is a disk shaped structure. The disk structure 131 of any first individual deck plank 111 is capable of attaching to any second individual deck plank 111 using a first lounge and groove joint. The disk structure 131 of any first individual deck plank 111 is further capable of attaching to any third individual deck plank 111 selected from the plurality of deck planks 101 using a second lounge and groove joint. The ability of each disk structure 131 to form two tongue and groove joints allows for the interconnection of the plurality of deck planks 101 into a single horizontally oriented load bearing surface. The disk structure 131 is designed to absorb solar energy from the sun. The disk structure 131 converts the received solar energy into heat. The disk structure 131 further comprises a tongue structure 141 and a groove structure 142.

For each disk structure 131, the tongue structure 141 is the tongue of a tongue and groove joint selected from the group consisting of: a) the first tongue and groove joint; and, b) the second tongue and groove joint. For each disk structure 131, the groove structure 142 is the groove of a tongue and groove joint selected from the group consisting of: a) the first tongue and groove joint; and, b) the second tongue and groove joint.

The tongue structure 141 of a first individual deck plank 111 selected from the plurality of deck planks 101 inserts into the tongue structure 141 of a second individual deck plank 111 selected from the plurality of deck planks 101 to form the selected tongue and groove joint. The tongue structure 141 of any first individual deck plank 111 selected from the plurality of deck planks 101 is sized to insert into the groove structure of any second individual deck plank 111 selected from the plurality of deck planks 101. The tongue structure 141 and the groove structure 142 are the physical structures used to interconnect the plurality of deck planks 101 to form the horizontally oriented load bearing structure.

The hairpin exchanger 132 is enclosed in the disk structure 131. The hairpin exchanger 132 is defined elsewhere in this disclosure. The disk structure 131 transfers the converted heat energy into the hairpin exchanger 132. The hairpin exchanger 132 is a fluid transport structure. The hairpin exchanger 132 of any first individual deck plank 111 selected from the plurality of deck planks 101 forms a first fluidic connection with a structure selected from the group consisting of: a) the reservoir structure 121 of the fluid transport structure 102; and, b) a second individual deck plank 111 selected from the plurality of deck planks 101. The hairpin exchanger 132 of any first individual deck plank 111 selected from the plurality of deck planks 101 forms a second fluidic connection with a structure selected from the group consisting of: c) the pump structure 122 of the fluid transport structure 102; and, d) a second individual deck plank 111 selected from the plurality of deck planks 101.

The hairpin exchanger 132 forms a fluid transport structure that transports water from the first selected structure to the second selected structure. The hairpin exchanger 132 forms a heat sink that draws the converted heat energy out of the disk structure 131 into the water flowing through the hairpin exchanger 132. The transfer of energy into the water by the hairpin exchanger 132 of each first individual deck plank 111 selected from the plurality of deck planks 101 heats the water as it flows through the fluid transport structure 102.

The hairpin exchanger 132 further comprises an intake fitting 151 and a discharge fitting 152.

The intake fitting 151 of any first individual deck plank selected from the plurality of deck planks 101 is a fitting. The intake fitting 151 of the first selected individual deck 16 plank 111 forms a fluidic connection with a structure selected from the group consisting of: a) the feed fitting 161 of the reservoir structure 121; and, b) the discharge fitting 152 of a second individual deck plank 111 selected from the plurality of deck planks 101. The intake fitting 151 receives the water flowing through the fluid transport structure 102 into the hairpin exchanger 132 of the individual deck plank 111.

The discharge fitting 152 of any first individual deck plank 111 selected from the plurality of deck planks 101 is a fitting. The discharge fitting 152 of the first selected individual deck plank 111 forms a fluidic connection with a structure selected from the group consisting of: a) the transfer fitting 162 of the pump structure 122; and, b) the discharge fitting 152 of a second individual deck plank 111 selected from the plurality of deck planks 101. The discharge fitting 152 discharges the water flowing through the fluid transport structure 102 into the transfer fitting 162 from the pump structure 122.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Deck: As used in this disclosure, a deck is an elevated horizontal surface that is intended to support a load.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Fitting: As used in this disclosure, a fitting is a component that attaches a first object to a second object. The fitting is used to form a fluidic connection between the first object and the second object.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Fluid Network: As used in this disclosure, a fluid network refers to a transport structure that: a) receives a fluid into the fluid network; b) transports the fluid through a series of pipes, valves, and manifolds; and, c) discharges the fluid from the fluid network.

Fluid Series Circuit: As used in this disclosure, a fluid series circuit refers to a method of connecting a plurality of fluid network elements that are connected to form a single fluid transport path from a first point to a second point in a fluid network.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Hairpin Exchanger: As used in this disclosure, a hairpin exchanger is a heat exchange structure formed a plurality of straight tubes connected using a hairpin tube.

Hairpin Tube: As used in this disclosure, a hairpin tube is a tube or pipe with a non-Euclidean prism structure. The tube or pipe is bent in a "U" shape reminiscent of a hairpin turn. This "U" reverses the actual physical direction of fluid flow while maintaining the direction of the fluid flow through the tube. Hairpin tube structures are often used in heat exchangers.

Heat: As used in this disclosure, heat refers to a transfer of energy between a first object and a second object such that the temperatures of the first object and the second object of one or both of the objects changes. In common usage, heat is said to flow from the warmer object to the cooler object. In systems where the combined energies of the first object and the second object remain constant, the equilibrium temperatures of the first object and the second object will be equal. The verb to heat is taken to mean the act of adding energy to the first object such that the temperature of the first object increases relative to a second object.

Heat Transfer: As used in this disclosure, heat transfer refers an exchange of thermal energy between a first object and a second object. In thermodynamics the first and second objects are often referred to as systems. This disclosure assumes that heat transfer occurs through three mechanisms: conduction, convection, and radiation. By conduction is meant that the heat is exchanged through the contact between the first object and the second object which facilitates the direct transfer of the energy of the vibration of the molecules of the first object to the molecules of the second object. By convection is meant that the heat is transferred through the exchange or movement of mass within and between the first object and the second object. By radiation is meant the transfer of heat energy in the form of (typically electromagnetic) waves between the first object and the second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the 14 center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center 24 axes of the first prism and the second prism need not be equal. The form factor of the congruent ends of the first prism and the second prism need not be geometrically similar.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular appearance. Plates often have a disk-like structure. The face of the plate is a surface of the plate selected from the group consisting of: a) the surface of the plate with the greatest surface area; b) the surface of the plate that is distal from the surface of the plate with the greatest surface area. The edges of the plate comprises the surfaces of the plate that would not be considered faces as defined above. As defined in this disclosure, plates may be made of any material, but are commonly made of metal, plastic, and wood. A plate is often referred to as a board or a plank.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Radiator and Heat Sink: As used in this disclosure, the radiator and the heat sink are heat exchange devices used to transfer energy in the form of heat from a first system (or object) into a second system (or object). Typically, the term radiator is used to describe a situation where the heat exchange device releases heat energy into the second system while the term heat sink is used to describe a situation where the heat exchange device extracts heat energy from the first system. It is not unusual to informally use the terms radiator and heat sink interchangeably. This is especially true in situations where the context provides a clear indication of the direction of the energy transfer.

Reservoir: As used in this disclosure, a reservoir refers to a container or containment system that is configured to store a fluid.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Temperature: As used in this disclosure, temperature refers to a relative measure of the kinetic and vibrational energy contained in the atoms and molecules of a first object (or system) relative to the kinetic and vibrational energy contained in the atoms and molecules of a second object (or system). When two objects (or systems) are in thermal equilibrium, the temperature of the two objects (or systems) is the same.

Tongue and Groove Joint: As used in this disclosure, a tongue and groove joint is a joint that is used to fasten a first plate or board to second plate or board. together. The groove portion of the tongue and groove joint is a groove that is formed in an edge of the first plate or board. The tongue portion of the tongue and groove joint is a ridge that is formed on the edge of the second plate or board. The tongue portion of the tongue and groove joint is sized and shaped such that the tongue portion of the tongue and groove joint can be inserted into the groove portion of the tongue and groove joint thus attaching the first plate or board to the second plate or board.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification.

Unless specifically noted in this disclosure, the vertical direction is always perpendicular to the horizontal direction.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A solar-heated decking board comprising
a plurality of deck planks and a fluid transport structure;
wherein the plurality of deck planks form a component of the fluid transport structure;
wherein the plurality of deck planks form a fluidic connection within the fluid transport structure;
wherein the fluid transport structure transports water into the plurality of deck planks;
wherein the plurality of deck planks comprise a collection of individual deck planks;
wherein the plurality of deck planks form a heat sink that: a) collects solar energy; and, b) converts the collected solar energy into heat energy; and, c) transfers the converted energy to water that flows through the fluid transport structure;
wherein each individual deck plank comprises a disk structure and a hairpin exchanger;
wherein the hairpin exchanger mounts in the disk structure.

2. The solar-heated decking board according to claim 1
wherein the plurality of deck panels are configured for use by a deck;
wherein each individual deck plank selected from the plurality of deck planks forms a load bearing structure;
wherein each selected individual deck plank further attaches to one or more additional individual deck planks selected from the plurality of deck planks to form horizontally oriented surface.

3. The solar-heated decking board according to claim 2
wherein the fluid transport structure is a fluid management system;
wherein the fluid transport structure stores water.

4. The solar-heated decking board according to claim 3
wherein the plurality of deck planks are mechanically interconnected such that any first individual deck plank selected from the plurality of deck planks attaches to one or more additional individual deck planks selected from the plurality of deck planks;
wherein the plurality of deck planks is connected to form the horizontally oriented supporting surface;
wherein any first individual deck plank selected from the plurality of deck planks is identical to any second individual deck plank selected from the plurality of deck planks.

5. The solar-heated decking board according to claim 4
wherein the plurality of deck planks are fluidically interconnected;
wherein by fluidically interconnected is meant that any first individual deck plank selected from the plurality of deck planks form a fluidic connection with one or more additional individual deck planks selected from the plurality of deck planks;
wherein the plurality of deck planks form a portion of the fluid transport path formed by the fluid transport structure;
wherein the plurality of deck planks is a heat transfer structure;
wherein the fluid transport structure comprises a reservoir structure and a pump structure;
wherein the reservoir structure forms a fluidic connection with the plurality of deck planks;
wherein the pump structure forms a fluidic connection with the plurality of deck planks.

6. The solar-heated decking board according to claim 5
wherein each individual deck plank forms a portion of the load bearing capacity of the horizontally oriented load bearing surface formed by the plurality of deck planks.

7. The solar-heated decking board according to claim 6
wherein the reservoir structure is a fluid containment structure;
wherein the reservoir structure stores the water that flows through the fluid transport structure in anticipation of use;
wherein the reservoir structure forms a fluidic connection with an intake fitting of the individual deck plank selected from the plurality of deck planks that is designated to receive the water into the plurality of deck planks for heating.

8. The solar-heated decking board according to claim 7
wherein the pump structure is a pump;
wherein the pump structure generates a pressure differential from the reservoir structure and through the hairpin exchanger of the plurality of deck planks into the pump structure;
wherein the pressure differential generated by the pump structure provides motive forces necessary to: a) draw the water out of the reservoir structure; b) move the drawn water through the hairpin exchanger formed by the plurality of deck planks; and, c) draw the water the flow out of the hairpin exchanger into the pump structure.

9. The solar-heated decking board according to claim 8
wherein the reservoir structure further comprises a feed fitting;
wherein the feed fitting forms a fluidic connection with a first individual deck plank selected from the plurality of deck planks.

10. The solar-heated decking board according to claim 9
wherein the pump structure further comprises a transfer fitting;
wherein the transfer fitting forms a fluidic connection with a second individual deck plank selected from the plurality of deck planks;
wherein the transfer fitting forms the fluidic connection between the pump structure the discharge fitting of the second individual deck plank,
wherein the transfer fitting receives the water flowing from the hairpin exchanger formed by the plurality of deck planks into the pump structure;
wherein the transfer fitting transports the received water into the pump structure.

11. The solar-heated decking board according to claim 10
wherein the disk structure is a disk shaped structure;

wherein the disk structure of any first individual deck plank is capable of attaching to any second individual deck plank using a first lounge and groove joint;

wherein the disk structure of any first individual deck plank is further capable of attaching to any third individual deck plank selected from the plurality of deck planks using a second lounge and groove joint;

wherein the ability of each disk structure to form two tongue and groove joints allows for the interconnection of the plurality of deck planks into a single horizontally oriented load bearing surface;

wherein the disk structure is designed to absorb solar energy from the sun;

wherein the disk structure converts the received solar energy into heat;

wherein the disk structure further comprises a tongue structure and a groove structure;

wherein for each disk structure, the tongue structure is the tongue of a tongue and groove joint selected from the group consisting of: a) the first tongue and groove joint; and, b) the second tongue and groove joint;

wherein for each disk structure, the groove structure is the groove of a tongue and groove joint selected from the group consisting of: a) the first tongue and groove joint; and, b) the second tongue and groove joint;

wherein the tongue structure of a first individual deck plank selected from the plurality of deck planks inserts into the tongue structure of a second individual deck plank selected from the plurality of deck planks to form the selected tongue and groove joint;

wherein the tongue structure of any first individual deck plank selected from the plurality of deck planks is sized to insert into the groove structure of any second individual deck plank selected from the plurality of deck planks;

wherein the tongue structure and the groove structure are the physical structures used to interconnect the plurality of deck planks to form the horizontally oriented load bearing structure.

12. The solar-heated decking board according to claim 11 wherein the hairpin exchanger is enclosed in the disk structure;

wherein the disk structure transfers the converted heat energy into the hairpin exchanger;

wherein the hairpin exchanger is a fluid transport structure;

wherein the hairpin exchanger of any first individual deck plank selected from the plurality of deck planks forms a first fluidic connection with a structure selected from the group consisting of: a) the reservoir structure of the fluid transport structure; and, b) a second individual deck plank selected from the plurality of deck planks;

wherein the hairpin exchanger of any first individual deck plank selected from the plurality of deck planks forms a second fluidic connection with a structure selected from the group consisting of: c) the pump structure of the fluid transport structure; and, d) a second individual deck plank selected from the plurality of deck planks;

wherein the hairpin exchanger forms a fluid transport structure that transports water from the first selected structure to the second selected structure;

wherein the hairpin exchanger forms a heat sink that draws the converted heat energy out of the disk structure into the water flowing through the hairpin exchanger;

wherein the transfer of energy into the water by the hairpin exchanger of each first individual deck plank selected from the plurality of deck planks heats the water as it flows through the fluid transport structure.

13. The solar-heated decking board according to claim 12 wherein the hairpin exchanger further comprises an intake fitting and a discharge fitting;

wherein the intake fitting of any first individual deck plank selected from the plurality of deck planks is a fitting;

wherein the intake fitting of the first selected individual deck plank forms a fluidic connection with a structure selected from the group consisting of: a) the feed fitting of the reservoir structure; and, b) the discharge fitting of a second individual deck plank selected from the plurality of deck planks;

wherein the intake fitting receives the water flowing through the fluid transport structure into the hairpin exchanger of the individual deck plank;

wherein the discharge fitting of any first individual deck plank selected from the plurality of deck planks is a fitting;

wherein the discharge fitting of the first selected individual deck plank forms a fluidic connection with a structure selected from the group consisting of: a) the transfer fitting of the pump structure; and, b) the discharge fitting of a second individual deck plank selected from the plurality of deck planks;

wherein the discharge fitting discharges the water flowing through the fluid transport structure into the transfer fitting from the pump structure.

* * * * *